United States Patent [19]
Tesvich et al.

[11] Patent Number: 5,976,601
[45] Date of Patent: *Nov. 2, 1999

[54] MILD HEAT TREATMENT OF OYSTERS IN THEIR NATURAL SHELL

[76] Inventors: John Tesvich, 30300 Highway 23S, Buras, La. 70041; Pat Fahey, 1200 Harmony St., New Orleans, La. 70115; John Schegan, P.O. Box 308, Kenner, La. 70063

[ * ] Notice: This patent is subject to a terminal disclaimer.

[21] Appl. No.: 09/096,465

[22] Filed: Jun. 12, 1998

[51] Int. Cl.$^6$ .............................. A22C 29/00; A23B 4/00
[52] U.S. Cl. ........................... 426/521; 426/524; 426/643
[58] Field of Search .................................. 426/520, 521, 426/524, 643

[56] References Cited

U.S. PATENT DOCUMENTS

| | | | |
|---|---|---|---|
| 3,615,726 | 10/1971 | McMillan | 99/217 |
| 3,658,559 | 4/1972 | Mohwinkel | 99/171 |
| 4,164,590 | 8/1979 | Mencacci | 426/407 |
| 4,659,574 | 4/1987 | Carlsson et al. | 426/524 |
| 4,992,289 | 2/1991 | Kiczek | 426/524 |
| 5,281,426 | 1/1994 | Pardo | 426/232 |
| 5,679,392 | 10/1997 | Tesvich et al. | 426/412 |
| 5,773,064 | 6/1998 | Tesvich et al. | 426/420 |

FOREIGN PATENT DOCUMENTS

0242183A1  4/1987  European Pat. Off. .

OTHER PUBLICATIONS

Ward, Donn: "Microbiological Aspects of Steam Shucking", *Food Science*, 1997.

Chai et al.:"Effect of Heat Processing on Quality of Pastuerized Oysters", *Journal of Food Science*, vol. 56, No. 5, 1991. pp. 1292–1294.

Chai et al.:"Extension of Shelf Life of Oysters by Pasteurization in Flexible Pouches", Journal of Food Science, vol. 49, 1984, pp. 331–332.

Chai et al.: "Bacterial Flora in Pasteurized Oysters after Refrigerated Storage", *Journal of Food Science*, vol. 53, No. 2, 1988, pp. 325–328.

Goldmintz et al.: "Bacteriological Evaluation of Steam Pastuerized Oysters, *Crassostrea virginica*", *Developments in Industrial Microbiology*, 1983, vol. 24, pp. 457–464.

(List continued on next page.)

*Primary Examiner*—George Yeung
*Attorney, Agent, or Firm*—Tom Hamill, Jr.

[57] ABSTRACT

A method of preparing raw oyster meat in the shell is disclosed which employs a mild heat treatment followed by chilling for the destruction of harmful pathogenic bacteria such as *Vibrio vulnificus*. The oysters are captured and transported to the processing plant in a refrigerated state. The oysters are then cleaned and graded into categories according the product size. The oysters are then placed into a continuous flow of sterilized water at a sufficient temperature and duration to kill the pathogens yet leave the meat in a raw state within the shell. Different temperatures and time durations have been found to give excellent results depending on the size of the oyster. It has been found that the internal temperature of the oysters, that is, the meat within the shell, must reach a minimum of 49 degrees centigrade and not exceed 53 degrees centigrade for maximum efficacy. Depending on oyster weight and warm water temperature, the oysters will be immersed from between about 10–45 minutes. The oysters are then removed from the heated water flow and are placed in a sterilized cold water bath or air convection cooler. At this point the treated oysters are ready for shucking using standard mechanical methods. The oysters remain in a raw state and in the shell throughout the process, prior to shucking. The shucking provides a treated, raw oyster meat free from harmful bacteria. The treated, raw oyster meat may be packed and stored by conventional structure. The pathogenic bacteria are reduced to an undetectable level in the oyster meat by this process. This process may be employed with any shellfish.

5 Claims, 1 Drawing Sheet

OTHER PUBLICATIONS

Cook & Ruple, "Cold Storage and Mild Heat Treatment as Processing Aids to Reduce the Numbers of *Vibrio vulnificus* in Raw Oysters", *Journal of Food Protection*, vol. 55, Dec. 1992, pp. 985–989.

Article, "Pastuerized oysters look fresh, taste raw", *Food Engineering*, Nov. 1979.

Article, "Low cost steam–heating of oysters reduces spoilage, improves shelf life", *Food Industries of South Africa*, Nov. 1979. (Dialog Abstract).

Article, "Developement of wet storage techniques for oysters and mussels ready for the market", *Southeast Asian Fisheries Development Center: Annual Report 1985*. (Dialog Abstract).

Article, "Steam Pasteurized Oysters—in some aspects more acceptable than the raw product", *Commerce News*, NOAA 1979. (Dialog Abstract).

Eduardo et al., "Pasteurized Surf Clams", Journal Article, CHILE, Feb. 1994. (Dialog Abstract).

MILD HEAT TREATMENT OF OYSTERS IN THEIR NATURAL SHELL

BACKGROUND OF THE INVENTION

1. Field of the Invention

The present invention relates generally to heat treatment of oysters, and more particularly, to a heat treatment process to be employed with oysters while the oysters remain in their natural shell. This process is employed to reduce and eliminate harmful bacteria found in oysters, such as *Vibrio vulnificus*.

2. Description of the Prior Art

While sea foods are generally considered healthy and safe to consume, concerns about the safety of eating raw oysters is widespread. Bacteria, such as the autochthonous estuarine bacterium *Vibrio vulnificus*, may be transferred from the marine environment to the oyster. This bacterium has been shown to cause primary septicemia, gastroenteritis and other disorders in humans. Septicemia generally leads to secondary cutaneous lesions and necrotic ulcers of the extremities, approximately sixty percent of all known cases result in fatalities. Other bacterium may also be pathogenic and may be introduced to the human through consumption of raw oyster meat. Some 10–15 deaths a year nationwide are attributed to oyster consumption, most of the oysters being harvested in the Gulf of Mexico during the summer months. Those who are immune compromised, suffer from hepatitis, other liver ailments, or diabetes may be more susceptible to the harmful effects of the *Vibrio vunificus* bacterium. The Gulf Coast is the major producer of oysters, providing between 12 and 20 million pounds annually, well above half the national supply.

The *Vibrio vulnificus* are located in oysters, and primarily this method will be utilized to destroy this pathogenic organism to permit the harvesting of oysters during the warmer months and in warmer waters, especially in the southern United States, where it has been proposed by the Food and Drug Administration to suspend the harvesting of oysters during the summer months as a health precaution.

As a result of the above concerns, we began developing processes to destroy such bacteria. Our initial process as outlined in U.S. Pat. No. 5,679,392 heat treats oysters in their shell for their eventual serving raw on the half shell. This heat treatment process is utilized on oysters which have been bagged prior to immersion in a warm water bath. These oysters are immersed in water between a temperature of 43–60 degrees centigrade for a time period of 30–45 minutes. They are subsequently cooled, shucked and served on the half shell.

The new invention contemplates heat treating oysters in their shell as well, but without the bag. Also, the new invention contemplates a water bath of between 49–55 degrees centigrade for a time period of between of about 10–45 minutes depending on the size of the oysters, the temperature of the water, and the initial temperature of the oyster meat within the shell. The instant invention contemplates that the meat within the oyster shell must exceed a temperature of 49 degrees centigrade, yet not exceed a temperature of 53 degrees centigrade. Oysters which have been treated by the new process will be safe and be are able to be served at a raw bar in a raw state. However, it is mainly contemplated that oysters which have been treated by the instant process may be mechanically shucked and their meat packaged by conventional means. This will permit safe oyster meat to be available for commercial consumption on a large scale.

Thus, while the foregoing prior art indicates it to be known to use warm water to heat treat oysters while the oysters remain in their shell, the concept of treating such oysters without the bag has not been disclosed. Also, the specific internal meat temperature range which must be reached and not exceeded is not taught in the prior art. By eliminating the bagging step a significant cost and labor saving is realized. This process is also directed not only to permit a consumer to eat such a processed oyster on the half shell, but also contemplates the mechanical shucking and subsequent packaging of the treated oyster meat for the marketplace. The heat treatment temperature and time ranges for the various weight oysters permits the process to completely eliminate the *Vibrio vulnificus* bacteria from the oyster prior to the removal of its shell. Other advantages of the present invention over the prior art also will be rendered evident.

SUMMARY OF THE INVENTION

To achieve the foregoing and other advantages, the present invention, briefly described, provides a method of treating raw oyster meat in the natural shell which employs a mild heat treatment and chilling for the destruction of harmful pathogenic bacteria such as *Vibrio vulnificus*.

The process may be outlined as follows. The oysters arrive at the processing plant in a refrigerated state. The oysters are then cleaned and graded into categories according the product size. The oysters are then placed into a continuous flow of water at a sufficient temperature and duration to kill the pathogens yet leave the meat in a raw state within the shell. Different temperatures and time durations have been found to give excellent results depending on the size of the oyster. The oysters are then removed from the heated water flow and are chilled. At this point the oysters are ready for shucking using standard mechanical methods. The oysters remain in a raw state and in the shell throughout the treatment process. At the completion of the treatment process, the treated oysters are ready to be shucked. The treated, raw oyster meat which has been removed from the shell may be packed and stored by conventional means. The pathogenic bacteria are reduced to an undetectable level in the oyster meat by this process.

Although this process is mainly directed to oysters, it may be employed with other marine organisms which have a shell. These organisms include bivalves, clams, or other such life forms.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a process for the treatment of oysters which reduces harmful pathogenic bacteria, such as *Vibrio vulnificus, Vibrio cholerae* and *Vibrio parahaemolyticus* to undetectable levels.

It is therefore an object of the present invention to provide a process for the treatment of oysters which provides a mild heat treatment and a chilling of the oyster, while the oyster remains in its natural shell.

It is therefore an object of the present invention to provide a process for the treatment of oysters permitting the treated oysters to be shucked and have the treated, raw oyster meat to be packaged by conventional methods.

It is therefore an object of the present invention to provide a process for the treatment of oysters where the internal temperature of the oyster meat inside the shell during the heat treatment process must exceed 49 degrees centigrade, yet never exceed 53 degrees centigrade.

Another object of the present invention is to provide a process for the treatment of oysters which provides a time period for the heat-up step and a time period for the dwell step as part of the heat treatment process. The treatment time for the heat-up step depends on the initial internal oyster meat temperature within the shell, the warm treatment water temperature and the oyster weight. The time period for the dwell step is the pasteurization time where the oyster (still in the natural shell) remains in the warm treatment water depending if a medium or high treatment is desired. Medium or High treatment may be chosen depending on location and time of year of the harvesting of the oysters, as some areas have a greater density of *Vibrio vulnificus* depending on water temperature and salinity.

Another object of the present invention is to provide a process for the treatment of oysters where the mild heat treatment is performed by immersing the oysters in their natural shell in water of not less than 49 degrees centigrade and not more than 55 degrees centigrade.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
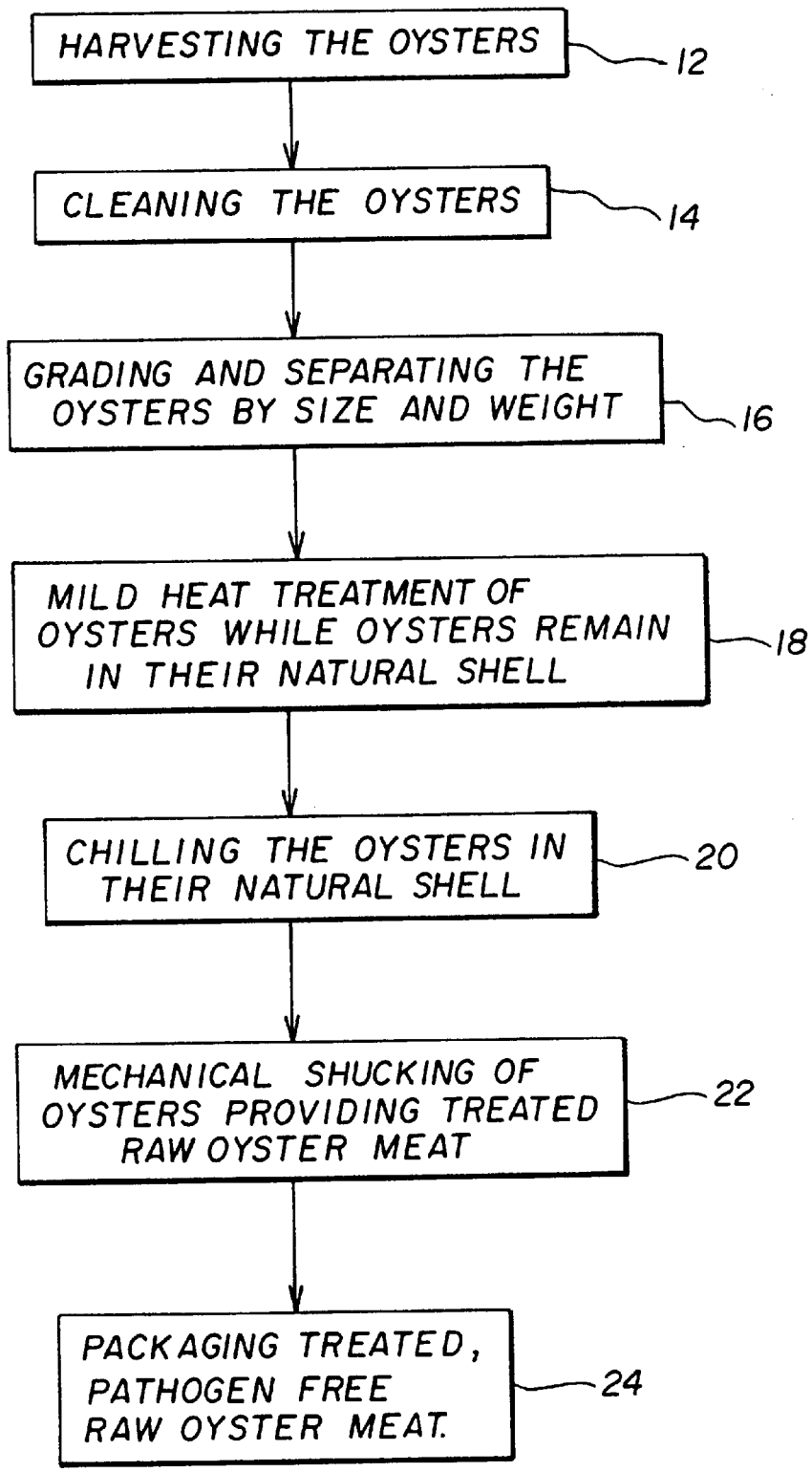
FIG. 1 is a block diagram in flowchart form showing the various steps of the process for the treatment of oysters which would eliminate the pathogenic bacteria.

With reference now to the drawings and tables, a new and improved mild heat treatment process for the treatment of oysters while they remain in their natural shell will be described.

Turning initially to FIG. 1, there is shown a block diagram describing the process for the mild heat treatment of oysters while the oysters remain in their natural shell. In its preferred form, the treatment process will include several steps. The first step will be the harvesting step 12. The oysters will be harvested in their indigenous environment by traditional techniques. These oysters live with the autochthonous estuarine bacterium *Vibrio vulnificus*, as well as other pathogenic bacterium. It is not possible to determine from the outward appearance of the oyster whether or not it is contaminated with any of the harmful bacterium, hence it may be appropriate to treat all harvested oysters. As a matter of fact, it has been determined that *Vibrio vulnificus* is present in virtually all oysters harvested in the Gulf of Mexico proximal the United States.

The oysters are then brought to the processing plant. The oysters are immediately placed in a refrigerated area, which maintains the mollusk in a living state.

The second step will be the cleaning step 14. During this stem mud, dirt, and any other external debris will be removed from the oyster. This will be followed by the third step 16 in which the oysters are graded by size and weight and separated into groups of similar size and weights. The separated oyster groups will be brought to the mild heat treatment area by conveyor or other equivalent means.

The fourth step in the process is the mild heat treatment step 18. The oysters, still in their natural shell are immersed in a bath or a continuous flow of warm water. The temperature of the water bath is between 49–55 degrees centigrade and the mild heat treatment process step lasts between 10–45 minutes depending on the grade size being treated. It has been determined that the internal temperature of the oyster meat in the shell must exceed 49 degrees centigrade in order to kill the bacteria. It has also been determined that if the internal temperature of the oyster meat in the shell exceeds 53 degrees centigrade that the edges of the meat begins to curl and shrink due to protein degradation. One may say that internal oyster meat temperatures in excess of 53 degrees centigrade cooks the oyster, as opposed to treating it.

Internal meat temperatures may be ascertained by random sampling during the actual processing to ensure quality control.

Referring now to Table 1 below, a chart for the processing time in minutes versus water temperature and oyster weight is provided. This table is based on an initial internal oyster meat temperature of 10 degrees centigrade. This table will provide one with the heat-up time that an oyster of a certain weight should be placed in the warm treatment water of a certain temperature. For example, oysters with a weight of between 151–190 grams will be selected to be treated in warm water that is 52 degrees centigrade. These oysters should remain in the warm water treatment for 16 minutes, if they have an initial internal temperature of 10 degrees centigrade.

The oysters will be further treated by what is termed a medium or high treatment process as shown in Table 2. Some harvesting areas are prone to having higher populations of *Vibrio vulnificus* contaminated oysters. The main factors in contamination include water temperature and salinity. Oysters harvested in the summer months in areas where *Vibrio vulnificus* is present in high levels will require high treatment. Oysters harvested during the winter months in cleaner waters may only require medium treatment.

Assuming that one desires high treatment on the above example, an additional 7 minutes treatment time will be added to the 16 minutes heat-up time giving a total treatment time of 23 minutes. At this point all *Vibrio vulnificus* bacteria will be destroyed.

It has also been determined that the initial internal oyster meat temperature is a very important factor in the time determination for length of treatment. Table 1 reflects an initial internal oyster meat temperature of 10 degrees centigrade. One minute time will be added for each 4 degree centigrade cooler the internal oyster meat temperature is. One minute time will be subtracted for each 4 degree centigrade warmer the internal oyster meat temperature is. Initial internal oyster meat temperature within the shell may be determined by taking a random sample of temperatures of the meat of oysters in that weight group.

TABLE 1

Processing Time in Minutes versus Water Temperature and Oyster Weight*

Water Temperature Degrees Celsius

| Average Oyster Weight, grams | 49° C. | 50° C. | 51° C. | 52° C. | 53° C. | 54° C. | 55° C. |
| --- | --- | --- | --- | --- | --- | --- | --- |
| 75–125 | 20 min | 18 | 16 | 14 | 12 | 10 | 8 |
| 126–150 | 21 | 19 | 17 | 15 | 13 | 11 | 9 |
| 151–190 | 22 | 20 | 18 | 16 | 14 | 12 | 10 |
| 190–215 | 23 | 21 | 19 | 17 | 15 | 13 | 11 |
| 216–265 | 24 | 22 | 20 | 18 | 16 | 14 | 12 |
| 266+ | 25 | 23 | 21 | 19 | 17 | 15 | 13 |

*based on initial internal oyster meat temperature of 10 degrees Celsius
Adjust processing time for initial internal oyster meat temperature variation as follows:
1 minute additional for 4° C. cooler
1 minute less for each 4° C. warmer After the proper internal oyster meat temperature is reached, the oysters are allowed to dwell in the warm water at the selected pasteurization temperature for a period of 2–15 minuted depending on the temperature of the water and the level of treatment desired as shown in Table 2.

TABLE 2

Pasteurization Dwell Times (minutes) For Medium and High Treatment Levels

Pasteurization Temperature: ° C.

| | 49° C. | 50° C. | 51° C. | 52° C. | 53° C. | 54° C. | 55° C. |
| --- | --- | --- | --- | --- | --- | --- | --- |
| Medium treatment | 10. min | 8.5 | 6.5 | 5. | 4. | 3. | 2. |
| High Treatment | 15. min | 12. | 9.5 | 7. | 5.5 | 4. | 3. |

In order to clearly understand how to determine the time periods for the mild heat treatment of the oysters where the oysters remain in their shell, the following examples are provided:

EXAMPLE 1

Large oysters in excess of 266 grams have been harvested in an area thought to require high treatment and are brought to the plant where they have been cooled and cleaned. It has been determined that their average internal meat temperature is about 10 degrees centigrade. The warm treatment water is kept at 55 degrees centigrade. The heat up time is developed from Table 1 to be 13 minutes. An additional 3 minutes is added due to the high treatment required by Table 2. Total time the oysters should be immersed in the warm treatment water is 15 minutes.

EXAMPLE 2

Small oysters less than 125 grams have been harvested in an area thought to require medium treatment and are brought to the plant where they have been cooled and cleaned. It has been determined that their average internal meat temperature is about 14 degrees centigrade. The warm treatment water is kept at 50 degrees centigrade. The heat up time is developed from Table 1 to be 18 minutes. A minute is subtracted from the treatment time as the internal oyster meat temperature is 14 degrees centigrade, reducing the treatment time to 17 minutes. An additional 8.5 minutes is added due to the medium treatment required by Table 2. Total time the oysters should be immersed in the warm treatment water is 25.5 minutes.

EXAMPLE 3

Medium large oysters which weigh between 216–275 grams have been harvested in an area thought to require no extra treatment and are brought to the plant where they have been cooled and cleaned. It has been determined that their average internal meat temperature is about 6 degrees centigrade. The warm treatment water is kept at 52 degrees centigrade. The heat up time is developed from Table 1 to be 18 minutes. No additional time is required due to initial conditions. Total time the oysters should be immersed in the warm treatment water is 18 minutes.

After the oysters have been heat treated in the warm treatment water for an appropriate time period they are cooled. The fifth step in the process is the cooling step 20. The treated oysters are placed in a chiller, refrigeration unit or immersed in cold water and quickly chilled. Quick chilling to an internal oyster meat temperature of less that about 7 degrees centigrade is preferred.

The sixth step in the process is mechanically shucking 22 the treated oysters. As a result of the mechanical shucking, treated, raw oyster meat is provided. This treated, raw oyster meat has been 'pasteurized', purged of living *Vibrio vulnificus*, and is safe for consumption. During the mild heat treatment step 18 the live oyster is killed. When this happens, the abductor muscle of the oyster body is relaxed which makes the oyster easier to shuck. It has been found that oysters treated by this process have increased shucking yields. This is due to the fact that most of the muscle remains with the shucked oyster meats, as opposed to non-treated oysters where a large portion of the abductor muscle remains with the shell and is disposed of as waste. Another factor is that the treated oysters appear to absorb some of the water, which increases their weight. The mild heat treatment step 18 stabilizes the oyster meat which is 95% water.

The seventh step in the process is the packaging step 24. During this step the treated, raw oyster meat is packaged for transport, storage, and sale. The mild heat treatment process 18 lowers the bacterial count which in turn will improve shelf life of the packaged, treated, raw oyster meat.

It is apparent from the above that the present invention accomplishes all of the objectives set forth by providing a new and improved process for the mild heat treatment of oysters in their natural shell which reduces harmful pathogenic bacteria, such as *Vibrio vulnificus*, to undetectable levels.

It is to be understood that the above tables and the time-temperature matrices developed therein are specific for the Gulf oyster *Crassostrea virginica*. There are many different varieties of shellfish which may be beneficially treated by the mild heat treatment process, with changes in temperatures of the heat treatment water and duration of immersion. Various factors, including shell thickness, density, porosity, species and pathogen level may be considered when contemplating modifying the above process for maximum efficiency in those cases.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A process for the heat treatment of oysters where the oysters remain in their natural shell during the heat treatment step of the process, including the steps of:
   a) heat treating the live, raw oysters in their natural shell, by placing the raw oysters in their natural shell into warm water at about a temperature of 49–55 degrees centigrade for about 10–45 minutes, said heat treating being at a temperature and for a time period sufficient to destroy harmful pathogenic bacteria including *Vibrio vulnificus,* yet leave the oysters in a raw state,
   b) cooling the heat treated, raw oysters in their natural shell by placing the oysters into cold water, chilling the meat inside the shell to less than 7 degrees centigrade, whereby the heat treated, pathogen free, raw oysters in their natural shell are ready for shucking.

2. A process for the heat treatment of oysters where the oysters remain in their natural shell during the heat treatment step of the process as claimed in claim 1 wherein the temperature of the oyster meat within the natural oyster shell must exceed about 49 degrees centigrade.

3. A process for the heat treatment of oysters where the oysters remain in their natural shell during the heat treatment step of the process as claimed in claim 2 wherein the temperature of the oyster meat within the natural oyster shell must not exceed 53 degrees centigrade.

4. A process for the heat treatment of oysters where the oysters remain in their natural shell during the heat treatment step of the process as claimed in claim 1, where the treated oysters are shucked, providing treated, raw oyster meat.

5. A process for the heat treatment of oysters where the oysters remain in their natural shell during the heat treatment step of the process as claimed in claim 4, wherein said treated, raw oyster meat is packaged.

* * * * *